Dec. 6, 1938.  F. L. SESSIONS  2,139,211
METHOD OF AND APPARATUS FOR WELDING TUBING
Filed June 21, 1934  4 Sheets-Sheet 1

INVENTOR:
Frank L. Sessions

Dec. 6, 1938. F. L. SESSIONS 2,139,211
METHOD OF AND APPARATUS FOR WELDING TUBING
Filed June 21, 1934 4 Sheets-Sheet 2

INVENTOR:
Frank L. Sessions

Dec. 6, 1938.                F. L. SESSIONS                2,139,211
             METHOD OF AND APPARATUS FOR WELDING TUBING
                        Filed June 21, 1934         4 Sheets-Sheet 3

INVENTOR:
Frank L. Sessions

Dec. 6, 1938.  F. L. SESSIONS  2,139,211
METHOD OF AND APPARATUS FOR WELDING TUBING
Filed June 21, 1934  4 Sheets-Sheet 4

Patented Dec. 6, 1938

2,139,211

UNITED STATES PATENT OFFICE 2,139,211

METHOD OF AND APPARATUS FOR WELDING TUBING

Frank L. Sessions, Lakewood, Ohio

Application June 21, 1934, Serial No. 731,791

22 Claims. (Cl. 219—10)

My invention relates to a method of and apparatus for welding a longitudinal seam in tubing by the electric resistance method and specifically to electric resistance welding wherein the electric current which is effective in flowing across the seam edges to heat the metal is applied to the tubing by the contact therewith of electrodes or other suitable, current-conducting, or contact, members. This form of welding may be termed "contact" electric resistance welding, as distinguished from "induction" electric resistance welding. My invention is particularly adapted to the progressive welding of tubular articles and specifically to the butt welding of longitudinal seams in metal tubes or pipes, although it will be apparent to those skilled in the art that certain features of my invention may be advantageously applied to stationary electric resistance welding of longitudinal seams in tubular articles. It will be apparent that my invention is particularly adapted to the method of electric resistance welding known as "flash" welding.

In the progressive electric resistance welding of longitudinal seams in tubular articles it is common practice to move the article longitudinally of itself at a constant speed so that cold unheated portions of the seam edges are successively and continuously heated and pressed together in a heating and welding zone to complete a weld between abutting edges of the seam. Electric resistance welding may be either "upset butt" welding or "flash" welding. In either case the heat necessary to make the weld is developed by a flow of electric current of very large amperage across the seam cleft from one seam edge to the other. In one type of machine used today the welding current is conducted to the tubing to be welded by copper contacts or electrodes which roll on the surface of the tubing on each side of the seam, as shown in Patent No. 1,388,434 to Johnston and in my Patent No. 1,722,711. This is "contact" resistance welding. Another type of resistance welding which is practiced today in the progressive welding of tubular articles utilizes the tube itself as a single turn secondary of a transformer with a suitably disposed and energized induction coil as the primary of the transformer. The welding current is caused to flow in the tube and across the seam as a result of electromotive force induced directly in the tube. This is "induction" electric resistance welding and the principles involved are described in my Patents 1,365,198 and 1,365,199 of January 11, 1921.

In contact welding, as heretofore practiced, the current flows across the seam in a very narrow zone. In induction welding the heating current flows across the seam in a zone of considerable length compared to contact welding and the weld is commonly a flash weld or a combined flash and upset butt weld. In induction welding slight irregularities on the surfaces of the seam edges are burned and flashed away and therefore the edge surfaces and the over-all width of the strip or plate which is formed into the tubular shape, need not be so carefully and accurately finished to size as is the case with contact welding.

When practicing progressive, contact welding the heating current is usually conducted to the article by roller electrodes, and two parallel paths for the electric current exist in the metal of the tubular article. One of these paths is between the electrodes and across the seam, and the other of the paths is around the body of the tubular article opposite the seam. This latter path is commonly described as being the path around the back of the tube or pipe. The magnitude of the current which flows around the back of the tube or pipe varies with the diameter, the wall thickness, the material being welded, the resistance of the path across the seam, and the voltage applied to the tube at the electrodes. If the resistance of the path across the seam is high, a larger proportion of the total current conducted to the pipe by the electrodes will flow around the back of the pipe. It will be obvious that when the resistance of the path across the seam is increased, it becomes necessary to increase the voltage applied to the pipe at the electrodes in order to cause a current of sufficient magnitude to flow across the seam, and this higher voltage increases the magnitude of the current flowing around the back of the pipe. For this reason in practicing contact welding it is necessary that the electrodes contact with the surface of the pipe closely adjacent to the seam on each side of the seam and that the path through the tube and across the seam be as short as possible and not be extended longitudinally or axially of the pipe. This latter result has been unavoidable in the heretofore practiced methods of contact welding of tubing and is accomplished by positioning the pressure rolls, which, together with the electrodes, form the welding throat, substantially in the same vertical, transverse plane with the centers of the electrodes.

My invention makes possible contact, electric resistance welding wherein the current conducted from the electrodes to the pipe or other tubular article being welded is caused to flow longitudinally as well as transversely of the pipe in passing between the electrodes and across the seam, so that the length of the seam across which the current is flowing at any one instant may be considerably increased over the short length of seam across which the current which is effective in heating the edges prior to the completion of the weld, flows in contact welding as heretofore practiced. This makes possible the utilization of the flash method of electric resistance welding, or a combined flash and upset butt method of electric resistance welding, with the resultant advantages which are present in induction welding, such as the burning and flashing away of irregularities on the edges of the seam and the avoidance of holes or unwelded spots due to surface irregularities and imperfections on the edge surfaces of the seam or on the surface where the electrodes contact. My invention has an advantage over induction welding in that the welding zone need not be so extended as is the case with induction welding, and the welding is completed nearer to the ends of the tubular article, particularly the trailing end.

This application is a continuation in part of my co-pending application, Serial No. 555,820, filed August 7, 1931 (now Patent No. 2,086,305, granted July 6, 1937).

Among the objects of my invention are:

The provision of method and apparatus for electric resistance welding of tubing wherein the heating and welding current which is conducted to the tube by the contact therewith of electrodes, is caused to flow across the seam and the tendency for a part of the current to flow around the back of the tube is greatly minimized, or entirely overcome.

The provision of method and means for applying a suitable electric resistance welding voltage to a tube by contact and inducing within the wall of the tube an electromotive force suitable to oppose the applied voltage and greatly reduce, or prevent, any flow of current from the electrodes around the back of the tube.

The provision of a method and apparatus for the progressive flash welding of a longitudinal seam in tubular articles wherein the heating and welding current is conducted to the tube by the contact therewith of roller electrodes, or other suitable current conducting contact members.

The provision of a method and means suitable for causing a heating and welding current conducted to a tube from an external source by current-conducting, contact members to flow across the seam in a zone of appreciable longitudinal extent.

The provision of a method and means for progressive, contact electric resistance flash welding wherein the heating current flows across the seam in a flash heating zone of appreciable longitudinal extent.

The provision of a magnetic core of low magnetic reluctance inside of a tube and a magnetic core of low magnetic reluctance outside of the tube, the outside core forming a return magnetic circuit for the magnetic field developed in the inside core, the outside core being spaced from the inside core at its ends by only short air gaps so that a substantially closed magnetic circuit is formed.

The provision of an energized coil adapted to develop a magnetic field inside of a tube being welded, the magnetic field extending generally parallel to the axis of the tube from a point considerably in advance of the contact with the tube of current-conducting electrodes to a point considerably beyond the contact of the electrodes.

The provision of a method and means for progressive, contact, flash electric resistance welding of a longitudinal seam in a tube wherein the seam edges are maintained in spaced-apart relation between electrodes which conduct the heating and welding current to the tube.

The provision of means for maintaining the seam edges of the tube to be welded in spaced-apart relation while passing the zone of electrode contact with the tube.

The provision of supporting means inside of a tube capable of withstanding electrode contact pressure on the outside of the tube, while the edges of the seam are maintained in spaced-apart relation between the electrodes.

The provision of an electric coil suitably positioned with respect to the tube being welded to develop an electromotive force in the wall of the tube, and means for controlling the phase relation and the magnitude of the voltage developed in the wall of the tube with respect to a voltage applied or conducted to the tube by electrical contact, so that the voltage induced in the wall of the tube is substantially opposed to the voltage applied to the tube.

The provision of an electric coil for developing a magnetic field which extends in an axial direction inside of a tube at and on each side of the point of contact with the tube of current conducting electrodes, and means for adjusting or varying the reactance of the circuit supplying power to the electric coil, and means for varying the voltage impressed on the circuit supplying power to the electric coil.

The provision of a method and means for the progressive flash welding of a longitudinal seam in a tube by the contact method whereby the location and length of the zone of flash-heating current flow across the seam edges may be readily located, controlled and regulated.

These and other objects which will be apparent from the specification and drawings are accomplished by the use of my invention.

In the drawings:

Figs. 1, 2 and 3 are diagrammatic, plan, side elevation, and vertical cross section, respectively, showing the conventional arrangement for progressive electric resistance welding of a tubular article by the contact method as it has been heretofore practiced. The vertical cross section, Fig. 3, is a section taken in a plane indicated by the line a—a on Figs. 1 and 2.

Figs. 4, 5 and 6 are diagrammatic, plan, side elevation, and vertical cross section on the line a—a of Figs. 4 and 5, respectively, illustrating the use of an internal magnetic core.

Figs. 7, 8 and 9 are diagrammatic, plan, side elevation, and vertical cross section on the line a—a of Figs. 7 and 8, respectively, illustrating the use of an internal magnetic core and with the addition of an external magnetic core which forms a return magnetic circuit for the magnetic lines of force developed inside of the tube.

Figs. 13, 14 and 15 are diagrammatic, plan, side elevation, and vertical cross section on the line a—a of Figs. 13 and 14, respectively, showing one form of my invention wherein the welding pressure rolls are offset from the electrodes in the direction of the travel of the tube, and internal and external magnetic cores are used to provide a substantially closed magnetic circuit of sufficient length on each side of the electrode contact whereby the tendency of the current applied by the electrodes to flow around the back of the tube may be resisted to a considerable extent.

Figs. 16, 17 and 18 are diagrammatic, plan, side elevation and vertical cross section on the line a—a of Figs. 16 and 17, respectively, showing another modified form of my invention wherein an internal core and coil are used. The external core is omitted.

Figs. 19, 20 and 21 are diagrammatic, plan, side elevation and vertical cross section on the line a—a of Figs. 19 and 20, respectively, showing a preferred form of my invention wherein progressive flash welding may be effected by current conducted to the tube from roller electrodes and caused to flow across the seam, and involves the use of internal and external magnetic cores and a suitably positioned and energized coil on the internal core.

In the preferred form of my invention I utilize roller electrodes and a welding transformer connected thereto such as are well known in the art and illustrated in Johnston Patent No. 1,388,434 or in my Patent No. 1,722,711, together with an internal magnetic core and an external magnetic core which provide a low reluctance path for a magnetic field capable of inducing an electromotive force in the pipe opposed to the electromotive force applied by the electrodes which tends to cause current to flow around the back half of the pipe. The edges of the pipe are maintained in spaced-apart relation between the electrodes and are brought together at a point beyond the electrodes in the direction of movement of the pipe, so that the welding current conducted to the pipe by the electrodes flows generally longitudinally of the pipe and then transversely across the seam in a zone of appreciable longitudinal extent compared to the zone or path of current flow of the heretofore practiced methods of contact resistance welding of tubing. The electrical resistance of the path between the electrodes and across the seam is thus considerably increased and a higher voltage must be applied to the pipe at the electrodes than is the case with contact welding as heretofore practiced. This means that a prohibitively large part of the total current would flow around the back of the pipe unless the proper steps are taken to resist, overcome or prevent such flow. I am able to minimize, or entirely prevent, the flow of current about the back half of the pipe by providing an internal, ferrous, magnetic circuit, preferably of laminated iron, and an external, ferrous, return magnetic circuit, also preferably of laminated iron. I preferably provide suitable electric coil means for developing a magnetic field in the internal and external cores. The magnetic field developed in the magnetic cores sets up a counter electromotive force in the wall of the pipe of sufficient magnitude to minimize or entirely prevent the flow of current from the electrodes around the back of the pipe.

I am aware that it has previously been suggested that an internal magnetic core will tend to prevent the flow of current around the back of a pipe being electrically welded when practicing stationary electric resistance welding, but as far as I am aware no one has previously realized the importance of the external, return magnetic circuit or core, or the possibility of utilizing an energized electric coil in connection with a magnetic core or cores in such a manner as to make possible in progressive welding the flow of welding current between the electrodes and across the seam through a path of comparatively high resistance or to make possible the use of the relatively high voltage which must be applied to the pipe at the electrodes to accomplish progressive flash welding or progressive welding where the effective welding current flows in a wide path or zone of appreciable longitudinal extent. In the practice of continuous, progressive electric resistance welding of tubing by the contact method, it has heretofore been impossible to cause a welding current to spread out and to flow across the seam in a heating zone of appreciable longitudinal extent because the necessarily increased voltage at the electrodes caused the current which flowed around the back of the pipe to increase so rapidly that it was impossible to properly heat the seam edges without excessive, or even prohibitive, losses and ruinous arcing and burning between the electrodes and the metal of the pipe.

My invention makes possible, in its preferred form, the practice of progressively flash welding longitudinal seams in pipes or tubes by the contact method, by permitting the edges of the tube to be brought together in the requisite flash-welding relation or pressure at a point behind the electrodes in the direction of movement of the tube and by permitting the application of sufficient voltage to the tube to cause the proper flash heating current to flow across the seam, without losing an excessive amount of power in the flow of current around the back of the tube or requiring the electrodes to conduct an excessively large current to the tube.

In the practice of my invention, I control the length of the zone across which current flows, so that by spreading out, or elongating, the zone of current flow across the seam edges, at each instant an appreciable length of seam is being heated by the instantaneous value of the alternating current then flowing. By the expression "an appreciable length of seam", I mean a perceptible or measurable length; the minimum practical length being several times the distance travelled by the tube during the duration of a single alternation or impulse of the welding current. Each point along the seam will thus be raised to substantially the same temperature. This length of flash-heating, current flow may be extended, depending upon the results desired and upon the diameter, thickness and material of the tube being welded and the welding speed. Thus if the flash-heating zone is two inches long and the welding speed is sixty feet per minute, any one point on the seam would pass through the zone of effective current flow for approximately one-sixth of a second. In this time some twenty impulses of 60 cycle alternating current will have flowed across the seam; the surface irregularities will be flashed or burned away and a uniform heat will have been progressively developed in the seam edges, so that they will be at the proper temperature and in proper condition for the final upsetting and pressure application when the tube passes through the welding pressure rolls. So many different factors enter into the determination of and the establishment of the length of the flash heating zone or the length of the zone of effective, cross-seam current flow, that the best length may preferably be determined by trial.

The diagrammatic illustrations shown in Figs. 1 to 24, inclusive, comprise eight groups of three figures each. In each group there is shown a tube, or pipe, 1, being welded. The tube is represented as moving from left to right and as having a longitudinally extending open seam 2. The welded seam is indicated at 3. Roller electrodes 4, 4, positioned in the plane indicated by the line a—a, contact with the outside surface of the tube on opposite sides of the seam. Welding pressure rolls 5, 5 are diagrammatically illustrated. The center line of the welding pressure rolls 5, 5 is indicated by a line b—b in each of the four groups shown in Figs. 13 to 24, inclusive. In the four groups shown in Figs. 1 to 12, inclusive, the center line of the welding pressure rolls 5, 5 is indicated as being located on, or substantially on a line a—a in each group which indicates a plane through the center of the electrode rollers 4, 4. The other parts which are diagrammatically illustrated in some or all of the drawings, Figs. 1 to 24, inclusive, are an internal, laminated magnetic core, shown variously at 6, 6a, 6b, 6c, 6d, 6e and 6f, an external, laminated magnetic core, shown at 7a, 7b, 7c, 7d and 7e, an internal electric coil, shown at 8, 8a and 8b, and an external electric coil 9. The general position of the zone in which electric current flows across the seam edges to heat the edges to the welding temperature is indicated by the letter W in all of the groups shown by Figs. 1 to 24, inclusive.

My invention provides for effectively reducing or preventing the flow of current from the electrodes around the back of the tube, thereby causing substantially all of the current applied to the tube from the electrodes to flow in a path across the seam edges. My invention further makes possible the controlling of the length and characteristics of the heating or welding zone to produce a heating or welding zone of appreciable longitudinal length; that is to say, my invention makes possible the spreading out of the flow of current across the seam so that the current flows across the seam in a zone of appreciable longitudinal extent. This result is preferably achieved by suitably maintaining the edges of the seam spaced apart, bringing them into contact at a point beyond the center line of the electrodes, and positioning the welding pressure rolls in a plane still further removed from the center line of the electrodes.

Figures 1, 2, 3, 4, 5, 6, 7, 8, 9, 13, 14, 15, 16, 17, 18, 19, 20, 21:
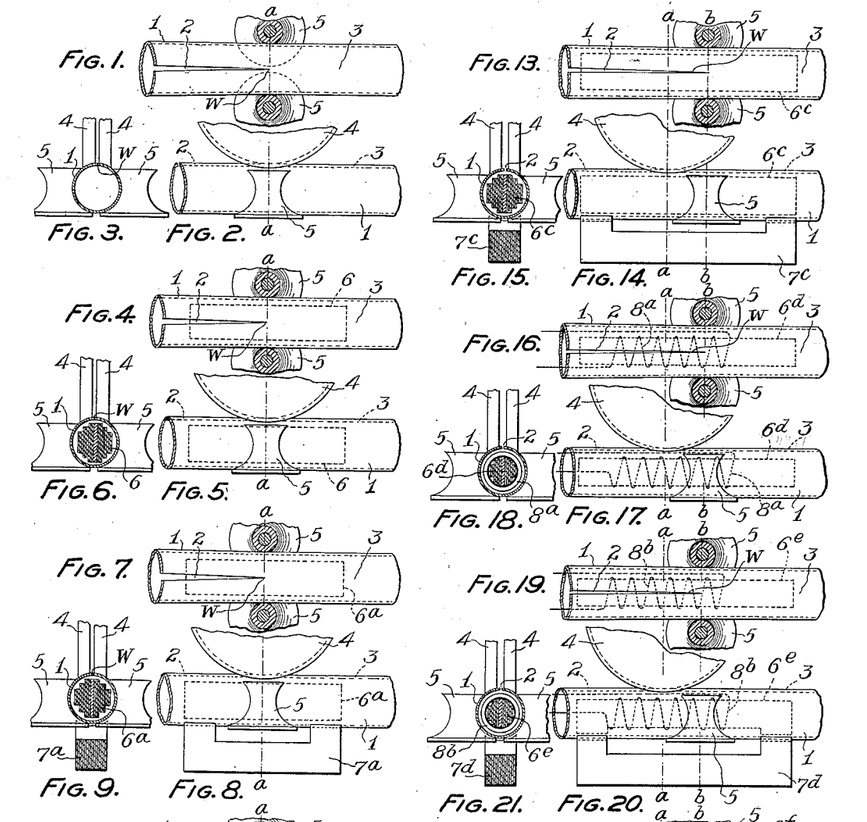

Heretofore the only practice which has been used in progressive electric resistance welding of tubing by the contact method has been that illustrated in Figs. 1, 2 and 3. The center plane of the welding pressure rolls has been substantially in the plane of the center of the electrode rolls, and within my knowledge not more than one-half inch either way from coincidence. The current flowing across the seam from one electrode to the other and which is effective in heating the edges before the completion of the weld, has flowed in a very narrow zone. Figs. 1, 2 and 3 are intended to illustrate both the practice under the Johnston Patent No. 1,388,434 and under Parpart Patent No. 658,741.

In welding in accordance with the Johnston Patent No. 1,388,434, the current which is effective in heating the seam to develop welding temperature flows across the seam in a highly concentrated stream or narrow zone.

In the welding which was practiced under the Parpart Patent No. 658,741, the longitudinal extent of the zone of cross-seam current which was effective for heating the seam edges and the metal of the tube was also very short. The edges of the seam in Parpart welding were caused to come together between the electrodes at a point which formed the apex of comparatively widely diverging sides of a V formed by the seam edges. The flow of current which was effective in heating the edges took place in a zone directly between the electrodes, in which zone the seam edges were pressed together in the manner used when practicing stationary, upset electric resistance welding. To maintain this upset heating zone, the voltage impressed on the tube by the electrodes, even at the low speeds used, was such that tests indicated that thirty per cent of the total current conducted to the tube flowed around the back of the tube.

The use of an internal magnetic core such as illustrated in Figs. 4, 5 and 6 was tried experimentally by me in connection with the Johnston method of contact resistance welding of tubing. It might be expected that such a core might decrease the flow of current around the back of the tube, but I found that the power consumption with such a core is substantially the same as when no core is used and, therefore, such cores produced no advantageous result and were never used in the commercial production of tubing.

By the use of both external and internal magnetic cores as illustrated in Figs. 7, 8 and 9, I provide a substantially closed magnetic circuit, the air gap being kept practically as short as possible. In this manner comparatively small current flowing around the back of the tube will produce a magnetization of the cores to develop a counter electromotive force in opposition to the electromotive force which is conducted or applied to the tube from the electrodes 4, 4 and which tends to cause the waste current to flow around the back of the tube. This is valuable, when welding with the Johnston or Parpart relation between the center line of the electrodes and the center line of the welding pressure rolls, in certain special cases where the material of the tube being welded, or the condition of the edges being welded, is such that best results can only be achieved by applying a considerably higher voltage across the electrodes than is normally used.

Figures 10, 11, 12, 22, 23, 24:
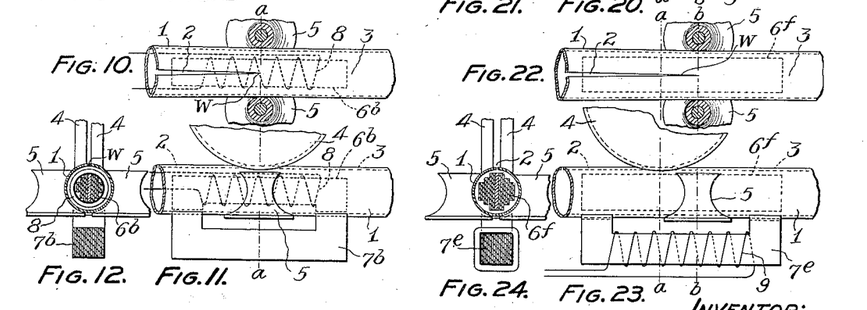
Figs. 10, 11 and 12 are diagrammatic, plan, side elevation, and vertical cross section on the line a—a of Figs. 10 and 11, respectively, illustrating the use of apparatus having a coil on an internal magnetic core.
Figs. 22, 23 and 24 are diagrammatic, plan, side elevation, and vertical cross section on the line a—a of Figs. 22 and 23, respectively, of a modified form of my invention wherein the coil is positioned on the external core only. This form is very effective where the diameter of the tube is such that an internal coil cannot conveniently be used.

The use of an energized coil in conjunction with internal and external magnetic cores is illustrated in Figs. 10, 11 and 12. In this case an electromotive force may be positively and controllably induced in the tube by an energized coil 8. The induced electromotive force may readily be controlled both as to magnitude and phase relation with respect to the electromotive force applied to the tube at the electrode contacts, so that flow of current from the electrodes around the back of the tube may be substantially or entirely prevented. A substantially closed magnetic circuit is formed by the cores 6b and 7b.

Preferred forms of my invention, however, are diagrammatically illustrated in Figs. 13 to 24, inclusive, some of which are shown in greater detail in the subsequent figures of the drawings. These figures 13 to 24 relate to the progressive electric resistance welding of a tubular article by the contact method wherein the seam edges are maintained in spaced-apart relation between the electrodes 4, 4 and are caused to come into contact at a point beyond, or removed from the area of electrode contact with the tube in the direction of travel of the tube, in such manner that the current flows across the seam edges in a flash heating zone W of appreciable longitudinal extent. After the flash heating of the surfaces and the metal closely adjacent to the surfaces of the seam edges has been accomplished, the welding pressure rolls 5, 5 exert the required pressure to complete the weld. The process generally involves a flashing between the seam edges and a subsequent squeezing together of the heated edges similar to that used in the very extensively practiced method of stationary flash, resistance welding. It may also include a subsequent region or zone of current flow where the edges are pressed together in more intimate contact than is used in flash welding. It has heretofore been impossible to apply or conduct to a tubular article the requisite voltage for flash welding without excessively large current flowing around the back of the tube. My invention so restricts and overcomes the tendency of the current to flow around the back of the tube that sufficient current is forced to flow across the seam, and to flow in a zone of appreciable longitudinal extent, preferably not directly between the electrodes. This means that it is possible to apply to the electrodes a flash welding voltage that will be sufficiently high to cause proper flash welding or heating of the seam edges.

Flash resistance welding is accomplished very effectively by induction welding such as illustrated in my Patents 1,365,198 and 1,365,199. However, when welding by the induction method a considerable length of tube is unwelded or improperly welded at each end, particularly at the trailing end of the tube. By the use of my invention the longitudinal seam of the tube may be flash welded with a very short length of scrap at the ends. The flashing zone may be made short and the length of scrap at the trailing end will not be more than the length between the center line a—a of the electrodes 4, and the center line b—b of the welding pressure rolls 5, 5. In straight, contact welding as practiced under the Johnston and Parpart patents, the edges of the seam must be very carefully prepared, and the circumference of the unwelded tube, i. e., the width of the strip which is formed into the tube, must be held within very close tolerances. In flash welding, irregularities of the edge surfaces of the seam are much less troublesome, and, in general, the condition of the edge surfaces and the circumference of the open seam tube need not be quite so accurately maintained as is the case with Johnston and Parpart welding. When the current which is effective in heating the seam flows across the seam in a zone of appreciable longitudinal extent, slight imperfections or irregularities on the surfaces of the tube with which the electrodes contact, will not cause unwelded or imperfectly welded spots in the seam.

When using an energized coil on one or both of the magnetic cores with my invention, this coil need only consume the power required to develop a suitable electromotive force in the wall of the tube to buck or oppose the applied electromotive force. The coil supplies little, or none of the power which goes into the actual heating of the edges. Because of this, the coil used may be of much smaller electrical capacity than that required for induction welding. This means that with any one frequency, an internal coil can be used with smaller tubes than in the case of induction welding. By increasing the frequency above 60 cycles per second, still smaller tubes can be welded when using an internal coil because the cross-sectional area of the core may be smaller.

In Figs. 25 to 31, inclusive, I have shown, somewhat diagrammatically, a machine for carrying out my invention. A tube or pipe 1 has a longitudinal open seam 2, the welded seam being indicated by the numeral 3. A base or bed of the machine is shown at 10. A pair of roller electrodes 4, 4 are arranged to contact with the outside of the tube on opposite sides of the seam. The electrodes 4, 4 are suitably supported above the tube by supporting members indicated generally at 11. Any suitable welding transformer may be mounted in the support 11. Transformer secondary terminals are indicated at 12 as extending downwardly from the transformer and forming a support for a shaft 13 on which the electrodes 4, 4 are mounted and insulated from each other and from the shaft 13. Brush holders 14 and brushes 15 serve to carry the large amperage welding current from the transformer terminal legs 12, to the roller electrodes 4, 4.

Figures 25, 31:
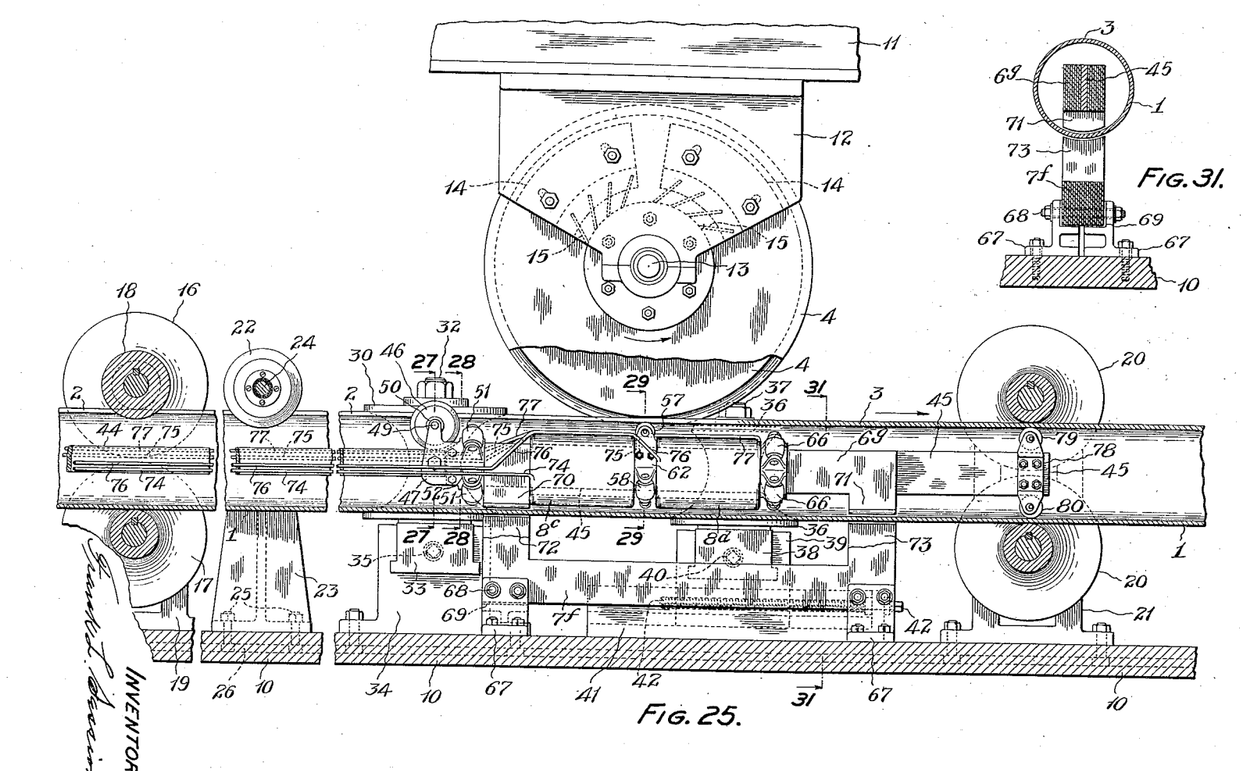
Fig. 25 is a side elevation, partly in section, of a machine embodying a preferred form of my invention.
Fig. 31 is a vertical cross section taken in a plane indicated by line 31—31 in Fig. 25.
Figure 26:
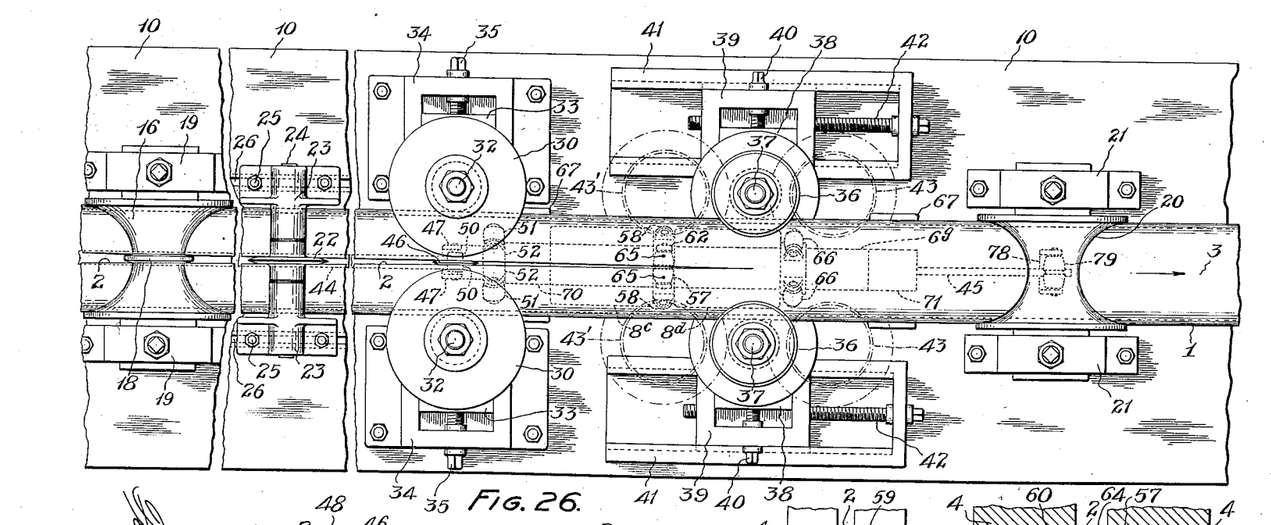
Fig. 26 is a partial plan view of the machine shown in Fig. 25.

Rolls 16 and 17 are suitably power driven and serve to assist in progressively and continuously moving the tube through the machine. Rolls 16 and 17 are located at the entering end of the machine. The roll 16 is provided with a central fin or disk 18 which enters between the unwelded edges of the open seam 2 and serves as a seam guide and a seam spreading means. The disk 18 thus acts to properly position and guide the seam of the oncoming tube and also insures proper spacing between the seam edges at the plane in which the rolls 16 and 17 are located. Bearing housings 19, 19 serve to support the rolls 16 and 17. Rolls 20, 20 located at the discharge end of the machine correspond to rolls 16 and 17 at the entering end of the machine. Rolls 20, 20 are suitably power driven and are supported in housings 21, 21. Mechanism for driving the rolls 16 and 17 and 20, 20 is not shown as such mechanism is well known and thoroughly understood by those skilled in the art.

A longitudinally adjustable seam-guiding disk 22 is supported by brackets 23 and is mounted on a shaft 24. The brackets 23 are secured to the base 10 by bolts 25. The bolts 25 extend into T-slots 26 in the base 10. The T-slots 26 are longitudinally extending, and as a result, the seam-spreading and seam-guiding disk or roller 22 may be adjusted longitudinally, i. e., in the direction of the axis of the tube, to suit the requirements of the particular tube and the manner in which the seam edges are caused to come together. By moving the seam spreading guide 22 in the direction of movement of the tube, the seam edges may be held apart so that they approach each other at a wider angle. Conversely, if the disk roller 22 is moved in the direction opposite to the direction of the tube movement, the edges of the seam will approach each other more gradually.

I find it convenient to describe the approaching seam edges as forming a V, the apex of the V being the point where the edges finally contact with each other. When the edges are caused to come together more abruptly, the condition existing may be described by saying there is a greater angle between the approaching (converging) sides of the V. When the seam edges come together more gradually, the condition may be described by saying that there is a smaller angle between the approaching (converging) sides of the V. Disks 22 of selected thicknesses may be used as additional means for controlling the space between the seam edges and the angle of convergence of the sides of the V formed by the seam edges.

Vertical axis rolls 30, 30 are positioned close to the heating and welding zone. The rolls 30, 30 are mounted on shafts 32, 32 and are supported on transverse slides 33, 33; the slides 33, 33 being mounted in slideway blocks or housings 34, 34. The rolls 30, 30 may be adjusted transversely of the tube, towards or away from the axis of the tube, by adjusting screws 35, 35. The rolls 30, 30 are shown as idle rolls, but if desired they may readily be power driven. The adjustment of the rolls 30, 30 serves to determine the opening between the seam edges at the plane in which they are located and assists in controlling and fixing the location of the point at which the edges come into contact with each other. The rolls 30, 30 also assist in guiding the tube into and through the heating and welding zone, support substantially the entire outer circumference of the tube, help to hold the edges in proper alignment for their subsequent accurate abutment, and tend to prevent overlapping and buckling of the seam edges.

Welding pressure rolls 36, 36 are mounted on vertical shafts 37, 37. These are preferably idle rolls. The rolls 36, 36 may be termed pressure rolls, or welding rolls. They serve to form the welding throat where the final circumferential pressure is exerted on the tube to squeeze the edges together and complete the weld. Rolls 36, 36 are supported by slide blocks 38, 38 which are mounted in transverse slideway members 29, 29 and may be adjusted transversely of the tube, towards or away from the axis of the tube, by means of adjusting screws 40, 40. The members 39, 39 are suitably mounted in longitudinal slideway members 41, 41 and may be adjusted longitudinally, or axially, of the tube by means of adjusting screws 42, 42. The transverse adjustment of the rolls 36, 36 serves to provide the proper welding pressure take-up, or upset at the seam edges. This transverse adjustment is used to properly correlate the pressure between the seam edges with the other factors involved in producing the desired weld. The longitudinal or axial adjustment of the rolls 36, 36 serves to properly position the point or plane of final welding pressure with respect to the vertical transverse plane through the center of the electrodes 4, 4, and may be utilized to change the angle between the converging sides of the V formed by the converging seam edges, change the location of the point of first contact of the seam edges which forms the apex of the V, and change the length and character of the heating zone where the current which is effective in heating the seam edges flows across the seam. The longitudinal adjustment of rolls 36, 36 is therefore very important in obtaining a flash welding zone of the desired length and characteristics. The dot-dash outlines 43, 43 and 43', 43' in Fig. 26 indicate approximately the extreme positions to which the rolls 36, 36 may be moved away from or towards the central plane of the electrodes in the particular apparatus shown.

Figure 27:
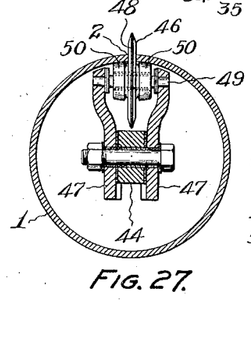
Fig. 27 is a vertical cross section taken in a plane indicated by the line 27—27 in Fig. 25.

A longitudinally extending anchor bar or rod 44 is suitably supported and positioned in known manner inside of the path of travel of the tube by an externally-supported, plate-like member, not shown. The bar 44 is suitably connected to an extension bar or plate 45 which extends substantially to the plane of the external rolls 20, 20. In the plane of the rolls 30, 30, a seam guiding disk 46 is supported on brackets 47, 47 which are mounted on the bar 45. As shown in Fig. 27, the internal roller or disk 46 is preferably formed of two halves insulated from each other by a disk of insulation 48, the two halves being mounted on a common shaft 49 and suitably insulated from the shaft 49 and from the brackets 47, 47. The two halves which form the disk 46 are provided with hubs or roller extensions 50, 50 adapted to bear against the inside surface of the tube closely adjacent to, and on each side of the open seam. This disk roller 46 serves very effectively in conjunction with the external rolls 30, 30 to guide and hold apart the seam edges and to hold the seam edges in the proper alignment for their subsequent accurate abutment. If desired, this disk roll 46 may be made radially adjustable in known manner by providing suitable eccentric mountings for the shaft 49. I prefer to mount the disk 46 on the shaft 49 with a slight amount of axial play, as shown in Fig. 27 but in some cases it may be desirable to eliminate this axial play or movement and use the disk 46 as a means for maintaining the bar 45 and the members supported thereby in the desired and fixed relation to the seam of the tube.

Figure 28:
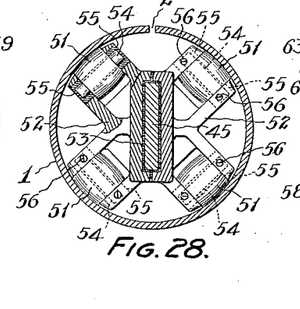
Fig. 28 is a vertical cross section taken in a plane indicated by the line 28—28 in Fig. 25.

Substantially in the plane of the external rollers 30, 30, I preferably provide circumferentially spaced, adjustable internal rollers 51, as shown in detail in Fig. 28. The rollers 51 are supported in a two-piece bracket 52, the two halves of which are supported by the bar 45 and are suitably insulated from each other and from the bar 45 by insulation 53. Each of the rollers 51 is provided with a shaft 54 which is supported in eccentric bushing 55. Bushings 55 are secured by set screws 56. Thus the internal rollers may be adjusted towards and away from the axis of the tube, i. e., towards and away from the inside surface of the tube. The rollers 51 act in conjunction with the external rollers 30, 30 and the internal disk roll 46 to establish and maintain the desired spacing between the seam edges, and to govern the angle of convergence of the seam edges and the location of the point where the seam edges first contact with each other. The rolls 51 also serve to assist in properly supporting and positioning the bar 45 and the parts and members secured thereto and act to prevent inward collapse of the tube.

Figure 29:
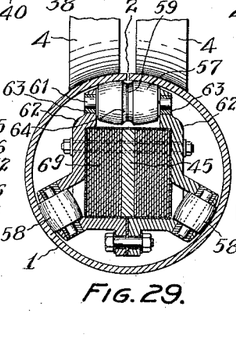
Fig. 29 is a vertical cross section taken in a plane indicated by the line 29—29 in Fig. 25.
Figure 30:
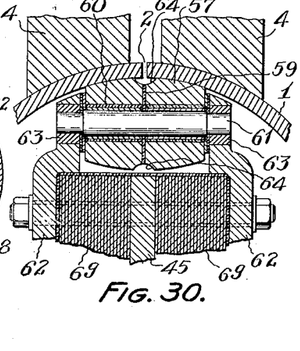
Fig. 30 is an enlarged detail of a portion of Fig. 29.

Substantially in a vertical plane through the center of the electrode rolls 4, 4, I prefer to provide another series of circumferentially spaced, adjustable internal rollers 57, and 58, 58, shown in detail in Figs. 29 and 30. The internal roller 57 is made up of two halves insulated from each other by insulation 59 and 60, and is mounted on a shaft 61. The shaft 61 is supported in suitable brackets 62, 62 by means of eccentric bushings 63, 63. The brackets 62, 62 are suitably bolted together and mounted on a core 6g, hereinafter referred to. I preferably provide a central groove 64 in roller 57 so that the seam edges will not be short circuited by the metal of one half of the roller 57. Rollers 57, 58, 58, brackets 62, 62, and the shafts for the rollers 57 and 58 are preferably made of non-magnetic material. The rollers 58, 58 are provided with similar eccentric bushings. The vertical plane including rollers 57 and 58, 58 is preferably located in substantially the same vertical plane as the centers of the electrode rollers 4, 4. The position of the roller 57 with respect to the central plane of the electrodes may be varied slightly to obtain the best contact between the electrodes and the tube. Such variation may be readily obtained by longitudinal adjustment of the rod 44, which may be readily made in a manner well known in the art. The approximate centers of the contact areas of the electrodes 4, 4 with the tube are shown at 65, 65 in Fig. 26.

Additional internal rollers 66 are also provided in a plane beyond the rollers 57 and 58, 58 and are supported by the bar 45 in a manner similar to rollers 51. The rollers 66 are adjustable by means of eccentric bushings in the same manner that the rollers 51 are adjustable.

An internal magnetic core 6g extends longitudinally inside of the tube from a point considerably in advance of the contact area of the electrodes with the tube to a point considerably beyond the contact area of the electrodes in the direction of tube movement. This magnetic core 6g is supported by bar 45 and is preferably made of thin laminations of electrical sheet steel. A two-part internal coil 8c and 8d surrounds the internal magnetic core 6g, 8c being the front coil and 8d the rear coil.

An external magnetic core 7f is supported on brackets 67 which are mounted on the base 10. The core 7f is formed of laminated electrical sheet steel, is secured to the brackets 67 by bolts 68 and is insulated from the brackets 67 by suitable insulation 69. This external magnetic core 7f extends parallel to the axis of the tube and substantially opposite the internal magnetic core 6g. The ends of the internal magnetic core 6g are provided with polar extensions 70 and 71. Opposite the poles 70 and 71 are poles 72 and 73, respectively, of the external core 7f. The front poles 70 and 72 preferably extend to points close to the inside and outside surfaces, respectively, of the tube, and are thus separated by as small an air gap as mechanically and commercially practical to permit the passage of the tube between the poles. The rear poles 71 and 73 are likewise preferably positioned with a short air gap between them. The external and internal magnetic cores thus complete a substantially closed magnetic circuit of relatively low magnetic reluctance, the external magnetic core serving as a return magnetic circuit of low magnetic reluctance for the magnetic field developed in the internal magnetic core.

Figure 34:
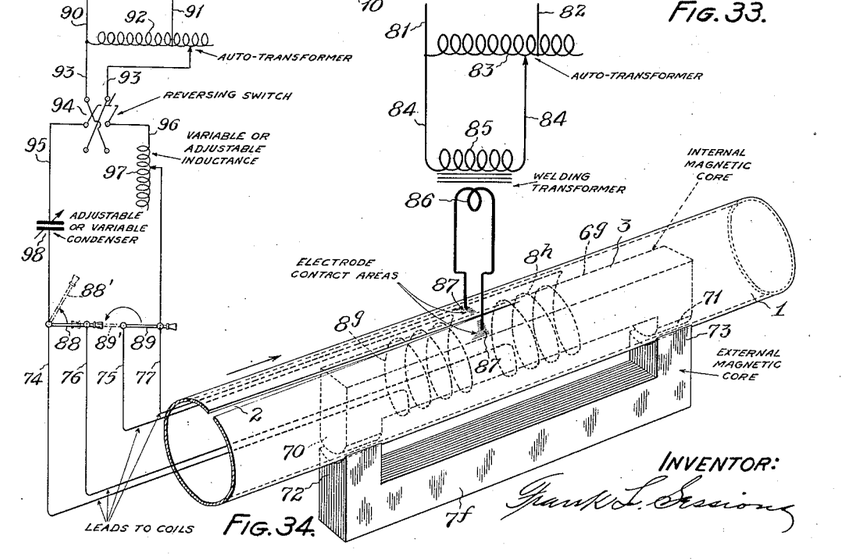
Fig. 34 is a diagrammatic perspective drawing of apparatus similar to that of Fig. 25 or Fig. 32, and includes a wiring diagram.

Electrical connections or conductors 74, 75, 76 and 77 are preferably carried into the tube at the point where the bar 44 is externally supported and extend along the bar 44 to the coils 8c and 8d. Conductors 74 and 75 are connected to the front and rear ends, respectively, of the front coil 8c. Conductors 76 and 77 are connected to the front and rear ends, respectively, of the rear coil 8d. These connections are shown in Figs. 25 and 34.

At the rear end of the bar 45 there is mounted a bracket 78 which carries internal rollers 79 and 80, which are adjustable radially or towards and away from the axis of the tube by means of adjustable eccentric bushings. The rollers 79 and 80 are located substantially in the plane of the rolls 20, 20 and serve to further support the bar 45 and the parts connected thereto. The roller 79 in conjunction with the top external roll 20 may be used to roll down the weld. The internal roller 80, positioned immediately above the lower external roll 20, serves to limit any downward movement of the supporting bar 45 when tubing is not present between the rolls.

Figure 32:
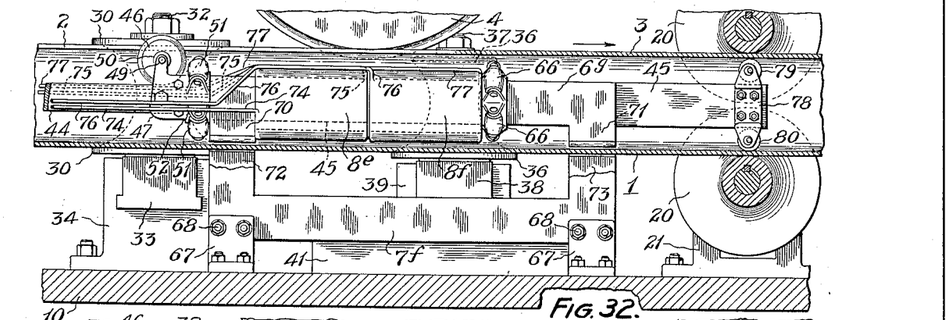
Fig. 32 is a partial side elevation, partly in section, showing a modified arrangement of parts of the machine of Fig. 25.

I find it generally desirable to provide the internal rollers 57 and 58, 58, which are located substantially under the electrodes 4, 4, in order to properly support the tube at this point to prevent the collapse of the top portion of the tube under the electrode contact pressure, and to assist in holding the seam edges apart between the electrodes 4, 4. There is a tendency for the tube to collapse under the pressure of the electrode contact when the edges are not in contact with each other between the electrodes. In some cases these internal rollers may be omitted, particularly when the pressure rollers 36, 36 are positioned fairly close to the electrodes, or when a tube having a relatively thick wall is being welded. This condition is shown in Fig. 32 wherein internal coils 8e and 8f are spaced apart only a distance sufficient for proper insulation. The other parts shown in Fig. 32 are the same as the parts shown in Figs. 25 and 26. It will be obvious that a single internal coil may be used instead of the two-part coil shown in Fig. 32.

Additional support for the tube under the electrodes 4, 4 may be provided by the use at this point of an additional set of external rolls, not shown in the drawings. Suitable rolls for this purpose are well known in the art, and they may readily be used when the pressure rolls 36, 36 are not located close to the central plane of the electrodes 4, 4.

Figure 33:
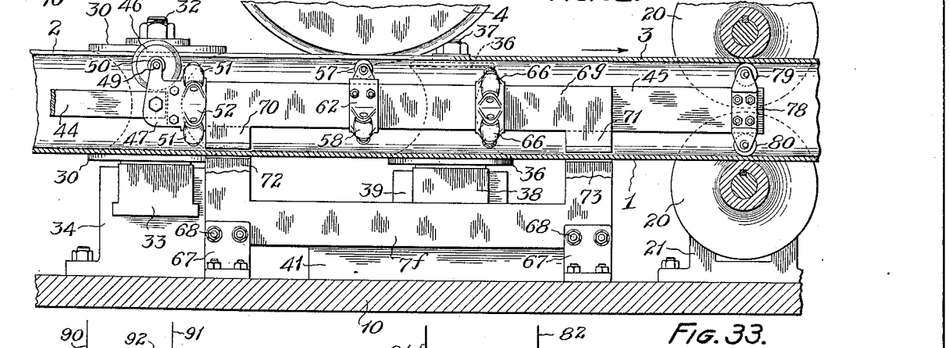
Fig. 33 is a partial side elevation, partly in section, of a modified form of my invention.

By providing a properly positioned and proportioned magnetic circuit of low magnetic reluctance made up of an internal magnetic core extending longitudinally inside of the tube from a point in advance of the electrode contact areas to a point behind the electrode contact areas and an external magnetic core outside of the tube, substantially opposite the internal magnetic core, it is possible to provide a magnetic circuit of such low reluctance that the current flow around the back of the tube from the electrodes may be to a considerable extent minimized without the use of any separately energized coils for developing a magnetic field in the internal core. This form is shown in Fig. 33. The parts shown in Fig. 33 are similar to the corresponding parts in Figs. 25 and 26, except for the absence of the internal coils. This is similar to the condition illustrated diagrammatically in Figs. 13, 14 and 15. When welding with the arrangement shown in Figs. 25 and 32, for example, where an energized coil or coils are used, the coils may be compared to the primary winding of a transformer and the tube may be compared to a single-turn secondary of the transformer, the voltage developed in the secondary being of such phase relation and such magnitude as to oppose the flow of current which tends to go around the back of the tube as a result of the voltage applied to the opposite sides of the seam by the electrodes. When the arrangement illustrated in Fig. 33 is used, the tube may be compared to an auto-transformer, the body of the tube serving as both primary and secondary of the transformer, as does the single winding of an auto-transformer. Thus, with a substantially closed magnetic circuit, a comparatively small amount of current flowing around the back of the tube from the electrodes may develop a sufficient secondary or counterelectromotive force in the tube to prevent excessive current flowing around the back of the tube, even though a voltage sufficiently high to maintain a flash heating zone of appreciable extent is applied to or conducted to the tube by the electrodes, but the use of an energized coil is preferable.

In the best practice of my invention, it is important to be able to control and regulate the angle of convergence of the seam edges, the location of the point of first contact between the edges, and the character, location and extent of the pressure relation between the edges prior to and during the final application of welding pressure. These factors may be controlled and regulated by the use either singly or in combination with one another of changes or adjustments of the rolls 16 and 17, the fin 18, the seam-guiding disk 22, rolls 30, 30, welding rolls 36, 36, disk roller 46, rollers 51, rollers 57 and 58, 58 and rollers 66.

To obtain the best results in the practice of my invention, the two electrodes 4, 4 should be spaced farther apart or otherwise so constructed that their contact areas with the surface of the tube do not extend as close to the seam as has heretofore been required in the practice of Johnston or Parpart welding. This wider spacing between the contact areas assists in producing a spreading out of the path of current flow across the seam. The use of such a wider space between the current-conducting contact areas on the opposite sides of the seam will cause more current to follow the path around the back of the tube unless the means which I have disclosed are used to prevent or resist such current flow. In fact, with such a wider space between the areas where current is conducted to the tube by the electrodes when not using my invention, the proportion of the total current which flows around the back of the tube is so large that it may be impossible to cause enough current to flow across the seam edges to heat them to the required welding temperature. Since the use of a wider space between the contact areas is not only possible but highly desirable, another important result is attained, namely, that the seam may weave from side to side or vary more from the exact central position between the electrodes without causing trouble in the welding.

My invention is illustrated diagrammatically and a wiring diagram of the electrical circuits which I prefer to use is shown in Fig. 34. Fig. 34 illustrates an arrangement similar to that shown in Figs. 25 and 32 wherein internal and external laminated magnetic cores are used with a two-part internal coil. A suitable single phase power supply is connected through a transformer or induction regulator, not shown, to leads 81 and 82 of an auto-transformer 83. Leads 84, 84 from the auto-transformer 83 are connected to a primary winding 85 of a welding transformer. The welding transformer is provided with a single turn secondary winding 86 which is capable of carrying the very large currents required for welding. The secondary 86 of the welding transformer is connected to roller electrodes or other suitable current conducting members which contact with the tube at the areas 87, 87. The seam edges are spaced apart between the electrodes so that the heating and welding current flowing from the electrodes must flow generally longitudinally of the tube in the direction of tube movement and then across the seam behind the electrodes. The internal coil means is made up of two parts, 8g and 8h, which may be externally connected either in series or in parallel by means of switches 88 and 89. Leads 90 and 91 which supply power to the internal coil means 8g and 8h are preferably arranged to be connected to one of the three phases of a three-phase power line, one phase of which is connected to the leads 81 and 82 which supply power to the welding transformer. The leads 90 and 91 are connected to an auto-transformer 92. Conductors 93, 93 from the auto-transformer 92 are connected to a reversing switch 94. From the reversing switch 94, connections 95 and 96 lead to the coils. In series with the coils I preferably provide a variable or adjustable inductance 97 and/or a variable or adjustable condenser 98. As shown in solid lines in Fig. 34 switch 88 connects conductors 74 and 76, and the switch 89 connects conductors 75 and 77 so that the two coils 8g and 8h are connected in parallel. When, as shown in dot-dash lines at 88' and 89', switch 88 is open and switch 89 connects conductors 75 and 76, the coils 8g and 8h are connected in series. By suitably choosing the phase of the three-phase power supply which is connected to the auto-transformer 92 and by suitably adjusting the inductance 97 or the condenser 98, I am able to maintain any desired phase relation between the voltage induced in the pipe and the voltage applied to the pipe by the electrodes. This phase relation may be obtained accurately by the use of an oscillograph. In practice, however, the phase relation may be substantially correctly established by choosing the proper one of the three phases of the power supply and adjusting the series reactance in the lines 95 and 96, while maintaining all other conditions constant, and maintaining a constant voltage across the electrodes, until the condition is reached where the maximum heat is being developed in the seam. When this is the case, it is obvious that substantially a minimum of power is being lost in current flow around the back of the tube. The voltage applied to the internal coils 8g and 8h should also be varied either by an auto-transformer 92 or an induction regulator, not shown, until proper conditions are established. This voltage, however, should not be raised to a point where an abnormally large current is caused to flow through the coils 8g and 8h. This can be determined by electrical instruments in the circuit. The coils 8g and 8h need not carry a particularly large current because it is not necessary that they assist the current from the electrodes in any way in developing a flow of heating current across the seam.

When using my invention, the total current which may be conducted by the electrodes into a tube, instead of including a large amount of waste current, becomes, to a large extent, effective welding current. Thus, although limitations in the current carrying capacity of the apparatus which comprises the circuit of the welding current, such as the area of contact between the electrodes and the tube, impose a limitation upon the total current which may be safely carried, the actual welding current (current which flows across the seam) may be greatly increased without changing the total current which flows in the circuit.

By my invention, the large, back-of-tube waste current which has heretofore been unavoidable when progressively welding a longitudinal seam in tubing, particularly the prohibitively large waste current which occurs when flash welding voltages are used, does not have to be supplied by the welding transformer or other source of low voltage welding current through sliding contacts and electrodes. By using an energized induction coil, energized at a relatively high voltage, I am, in effect, able to supply the waste power at a high voltage without requiring such power to be conducted at low voltage through brushes, electrodes or other parts of the apparatus which, of necessity, must carry the low voltage, high-amperage current which flows across the seam to do the actual welding.

It will be obvious to those skilled in the art that numerous other modifications of the structures shown and described may be used; for example, coils may be placed on both the internal and the external cores, or if desired each section of a two-part coil may be energized from an independent circuit.

In considering positions along the tube and in the machine, the term "in advance" is used to mean on the side from which the tube is moving, that is, toward the entering side of the machine. The terms "behind" or "beyond" are used to mean in the direction of movement of the tube, that is, toward the exit side of the machine.

I claim:

1. The method of progressive, electric resistance welding of a longitudinal seam in tubing, which comprises conducting electric current to the tube by contact on each side of the seam cleft in advance only of the meeting point of the seam edges from a source capable of supplying current of suitable amperage for welding, causing the edges of the seam to move progressively together at a point beyond the region where said current enters the tube, and inducing in the body of the tube a circumferential electromotive force opposing the flow of current around the back of the tube from said source, thereby largely limiting the flow of said conducted current to a path through the metal of the tube and across the seam in the region where the seam edges move together.

2. The method of progressive electric resistance welding of a longitudinal seam in a tubular article, which comprises progressively moving the tubular articles parallel to the seam, conducting electric current to the tubular article by contact on each side of the seam cleft at a zone where the edges of the seam are spaced apart, causing said edges to meet progressively at a point beyond said zone of contact in the direction of movement of the tubular article to establish and maintain a flash heating zone of appreciable longitudinal extent wherein said electric current may flow across the seam edges, developing a magnetic field inside of said tubular article capable of inducing within the body of said tubular article an electromotive force substantially opposed around the back of said tubular article to the applied potential which causes said electric current to flow and variable with respect to said applied potential, maintaining said induced electromotive force at such magnitude and phase relation as substantially to prevent flow of said electric current around the back of said tubular article, and applying welding pressure to said tubular article.

3. The method of progressive electric resistance welding of a longitudinal seam in tubing which comprises progressively moving the tubing in a direction parallel to the seam, applying from an external source by members making contact at relatively high pressure with the tube on opposite sides of the seam in advance only of the meeting point of the edges of the seam, an electromotive force suitable for welding, maintaining the edges of the seam in such spaced-apart relation between said contact members as to prevent cross-seam current flow at the zone of contact of said members, applying internal pressure for supporting the wall of the tube to resist the external pressure of the contact members on the tube, bringing the edges close enough together to permit cross-seam current flow at a point beyond said contact zone in the direction of movement of the tube, and establishing an electromotive force around the back of the tube substantially in phase opposition to said first-named electromotive force and of substantially the same magnitude as said first-named electromotive force.

4. In apparatus for the progressive, electric resistance welding of a longitudinal seam in tubing, means for progressively moving the tubing parallel to the seam, a welding transformer, current conducting contact members electrically connected to said welding transformer and adapted to contact with the surface of a relatively short portion of the length of said tubing on opposite sides of the seam to be welded and to conduct impulsive welding current to said tubing, an energized electric coil inside of said tubing, the axis of said coil being substantially parallel to the axis of said tubing, said coil being positioned substantially opposite said contact members and extending axially from a point in advance of the contact areas of said contact members to a point behind said contact areas in the direction of travel of said tubing, means for energizing said coil with impulsive current whereby the current flowing in said coil flows at substantially every instant substantially in the same circumferential direction that current tends to flow around the back of said tubing from said contact members, and means for pressing the edges of the seam together.

5. In apparatus for the progressive, electric resistance welding of a longitudinal seam in tubing, a welding transformer, current conducting contact members electrically connected to said welding transformer and adapted to contact with the surface of the tubing on opposite sides of the seam to be welded and to conduct impulsive welding current thereto, a longitudinally disposed magnetic core inside of said tubing, said core extending from a point in advance of the contact areas of said contact members to a point behind said contact areas in the direction of travel of said tubing, an electric coil adapted when energized to develop a magnetic field of force in said magnetic core, said coil and said magnetic core being adapted to cause the magnetic lines of force of said magnetic field to extend in a substantially axial direction and to extend in the same direction at any one instant from a point in advance of said contact areas to a point behind said contact areas in the direction of tube travel, means for progressively moving said tubing in a direction parallel to the seam, and means for pressing the edges of the seam together.

6. In apparatus for the progressive, electric resistance welding of a longitudinal seam in tubing, a welding transformer, means for supplying alternating current from the opposite terminals of said welding transformer by contact to opposite sides of the seam to be welded, means for substantially preventing the flow of current around the back of the tubing comprising an internal magnetic core inside of said tubing, said core extending from a point in front of to a point behind the control areas of said current-supplying means with said tube, an external magnetic core outside of the tubing opposite said internal magnetic core, means for maintaining a spaced-apart relation between the edges of the seam between the contact areas of said current-supplying means, means progressively moving said tubing in a direction parallel to the seam, and means for causing said seam edges to come together at a point beyond said contact areas in the direction of movement of the tubing.

7. In apparatus for the progressive, electric resistance welding of a longitudinal seam in tubing, a welding transformer, means for supplying alternating current from opposite terminals of said welding transformer by contact to opposite sides of the seam to be welded, means for substantially preventing the flow of current around the back of the tubing comprising an internal magnetic core inside of said tubing, said core extending from a point in front of to a point behind the contact areas of said current-supplying means, an external magnetic core outside of the tubing opposite said internal magnetic core, electric coil means adapted when energized to develop a magnetic field of force in said cores, means for maintaining a spaced-apart relation between the edges of the seam between the contact areas of said current-supplying means, means for progressively moving the tubing in a direction parallel to the seam, and means for causing said seam edges to come together at a point behind said contact areas in the direction of movement of the tubing.

8. In apparatus for the progressive electric resistance welding of a longitudinal seam in tubing, a pair of roller electrodes contacting with the surface of the tube on opposite sides of the seam, means for maintaining said seam edges spaced apart between said electrodes, means for causing said edges to come together at a point behind the plane of the center of said electrodes, a longitudinally extending magnetic core supported inside of said tube, said core extending longitudinally in both directions from the region of contact of said electrodes with said tube, induction coil means adapted to develop when energized a magnetic field of force in said core, and means for progressively moving said tube in a direction parallel to the same.

9. In apparatus for the progressive, contact, electric resistance welding of a longitudinal seam in tubing, means for progressively moving the tubing in a longitudinal direction, current conducting contact members adapted to contact with the surface of the tubing on opposite sides of the seam to be welded and energized to conduct impulsive welding current thereto at a flash welding voltage, said contact members being relatively widely spaced apart across the seam whereby substantial lateral weaving of the seam between said contact members is permissible, means adapted to establish a flash-heating relation between the seam edges in a zone of appreciable longitudinal extent, and means for substantially preventing the flow of current from said contact members around the back of the tube, comprising means for inducing in the body of said tube an electromotive force tending to cause current to flow substantially circumferentially in said tube around the back of said tube and in substantially the opposite direction to that in which the current tends to flow around the back of said tube from said contact members.

10. In apparatus for the progressive, electric resistance welding of a longitudinal seam in tubing, a welding transformer, a pair of roller electrodes electrically connected to said transformer, said electrodes being adapted to contact with the surface of the tubing on opposite sides of the seam to be welded and to conduct impulsive welding current thereto, said electrodes being electrically a relatively long distance apart across the seam, and means for substantially preventing the flow of current from said electrodes around the back of the tubing comprising an internal magnetic core inside of said tubing, said core extending from a point in advance of the contact areas of said electrodes to a point behind said contact areas in the direction of travel of the tubing, electric coil means adapted when energized to develop a magnetic field of force in said core, the electric resistance of the path between said contact areas and across said seam being such that an excessively large amount of current would flow around the back of the tubing if said core and coil means were not present, means for progressively moving the tubing in a direction parallel to the seam, and means for pressing the edges of the seam together.

11. In apparatus for the progressive, electric resistance welding of a longitudinal seam in tubing, means for supplying alternating current from opposite terminals of a supply circuit by contact to opposite sides of the seam to be welded, and means for substantially limiting the flow of current around the back of the tubing comprising an internal magnetic core inside of said tubing, said core extending from a point in front of to a point behind the contact areas of said current-supplying means, and an external magnetic core outside of the tubing opposite said internal magnetic core, the space between said cores being shorter at their ends than at intermediate points, means for progressively moving the tubing in a direction parallel to the seam, and means for pressing the edges of the seam together.

12. In apparatus for the progressive, electric resistance welding of a longitudinal seam in tubing, means for supplying alternating current from opposite terminals of an electric supply circuit by contact to opposite sides of the seam to be welded, means for substantially preventing the flow of current around the back of the tubing comprising an internal magnetic core inside of said tubing, said core extending from a point in front of to a point behind the contacts areas of said current-supplying means, an external magnetic core outside of the tubing opposite said internal magnetic core, the space between said cores being shorter at their ends than at any intermediate point, electric coil means adapted when energized to develop a magnetic field of force in said cores, means for varying the phase relation between the current flowing in said electric coil means and said alternating current supplied by contact, means for varying the magnitude of the voltage impressed on said coil, means for progressively moving said article in a direction parallel to the seam, and means for pressing the edges of the seam together.

13. In apparatus for the progressive, electric resistance welding of a longitudinal seam in tubing, a welding transformer having primary and secondary windings, a pair of roller electrodes electrically connected to said secondary winding and adapted to contact with the surface of the tube to be welded on opposite sides of the seam, magnetic core means extending longitudinally of said tube in the region of contact of said electrodes with said tube, said core means having a portion inside of said tube and a portion outside of said tube opposite said inside portion, and an electric coil adapted when energized to develop a magnetic field of force in said core means, said electrodes and said core means being relatively so disposed and so energized that the electromotive force induced in a circumferential path in said tube by the lines of force in the energized core means, is substantially opposed in direction to the electromotive force which is applied to said tube by said electrodes and which tends to cause current to flow in a circumferential path around the back of said tube, means for progressively moving said tube in a direction parallel to the seam, and means for pressing the edges of the seam together.

14. The method of progressive, electric resistance welding of a longitudinal seam in tubing wherein welding current is developed in an external source such as a welding transformer and applied to the tube by current-conducting, contact members, which comprises the steps of moving the tube progressively in a direction parallel to the seam to be welded, continuously conducting by contact, at a flash-welding voltage, a high-amperage alternating current to the tube on opposite sides of said seam at contact areas relatively widely spaced apart across the seam whereby substantial lateral weaving of the seam between the contact areas is permissible, inducing within the tube an alternating electromotive force which tends to cause current to flow circumferentially around the tube throughout the entire length of the portion of the tube to which said high-amperage current is conducted, said electromotive force being of such instantaneous magnitude and direction as to reduce materially the flow of said high-amperage current around the back of the tube and to confine said high-amperage current substantially to a path which crosses the seam to be welded, maintaining a flash-welding relation between the seam edges throughout a zone of appreciable longitudinal extent in said path of cross-seam current, and pressing said edges together progressively to complete the weld at a point near the end of said zone in the direction of movement of said tube.

15. In apparatus for the progressive electric resistance welding of a longitudinal seam in a tubular article, an external source of welding current, a pair of electrodes adapted to conduct electric current to said article from said source, means for maintaining the seam edges apart between the contact areas of said electrodes with said article, means for bringing the seam edges together at a point behind said contact areas in the direction of movement of said article, a longitudinally extending magnetic core supported inside of said article, said core extending longitudinally in both directions from said contact areas, induction coil means adapted to develop when energized a magnetic field of force in said core, means for varying the phase relation between the current flowing in said induction coil and the current conducted to said article by said electrodes, means for varying the magnitude of the voltage impressed on said induction coil, and means for progressively moving said article in a direction parallel to the seam.

16. The method of progressive, electric resistance welding of a longitudinal seam in tubing which comprises causing the tube to move longitudinally in a direction parallel to the seam, conducting a low-voltage, large amperage alternating current to the tube by contact in advance only of the meeting point of the seam edges, whereby said current tends to flow across the seam in only one direction at any one instant, inducing within the body of the tube from a separate source of relatively high voltage electrical energy a circumferential difference of potential substantially opposed around the back of the tube to the potential of said current applied by contact and of such magnitude and phase as substantially to confine the flow of said current to a path across the seam whereby substantially the entire current applied to the tube by contact will be effective in heating the seam edges and whereby substantially the entire heating of the seam edges will be effected by said current in the region where said current flows across the seam, and pressing the seam edges together.

17. In apparatus for the progressive, electric resistance welding of a longitudinal seam in tubing, a welding transformer, means for supplying alternating current from opposite terminals of said welding transformer by contact to opposite sides of the seam to be welded, means for substantially preventing the flow of current around the back of the tubing comprising an internal magnetic core inside of said tubing, said core extending from a point in front of to a point behind the contact areas of said current-supplying means, electric coil means adapted when energized to develop a magnetic field of force in said core, means for maintaining a spaced-apart relation between the edges of the seam between the contact areas of said current-supplying means, means for progressively moving the tubing in a direction parallel to the seam, and means for causing said seam edges to come together at a point behind said contact areas in the direction of movement of the tubing.

18. In apparatus for the progressive, contact, electric resistance welding of a longitudinal seam in metal tubing wherein substantially the entire welding current is conducted to the tube by contact at relatively short zones on each side of the seam, a welding transformer having primary and secondary windings, current conducting contact members electrically connected to the secondary of said welding transformer and adapted to contact with said tube on opposite sides of the seam to be welded and to apply a potential difference across the seam cleft, an electric coil inside the path of movement of said tube, said coil being adapted when energized to induce a circumferential electromotive force in the wall of said tube throughout a zone extended longitudinally of the tube in each direction from the region of contact of said electrodes with said tube, the direction of said electromotive force being, at each instant, the same along the entire extent of said zone, means for maintaining said electromotive force at such magnitude and phase relation as substantially to prevent flow of current around the back of said tube, means for progressively moving said tube in a direction parallel to the seam, and means for pressing the edges of the seam together.

19. In apparatus for the progressive, electric resistance welding of a longitudinal seam in tubing, a welding transformer, current conducting contact members electrically connected to said welding transformer and adapted to contact with the surface of the tubing on opposite sides of the seam to be welded and to conduct impulsive welding current thereto, a longitudinally disposed magnetic core inside of said tubing, an electric coil so constructed and arranged as to develop when energized a magnetic field of force in said magnetic core, said coil and said magnetic core being so constructed and arranged as to cause the magnetic lines of force of said magnetic field to extend in a substantially axial direction and to extend in the same direction at any one instant from a point in advance of the contact areas of said contact members to a point behind said contact areas in the direction of tube travel, means for progressively moving said tubing in a direction parallel to the seam, and means for pressing the edges of the seam together.

20. In apparatus for the progressive, electric resistance welding of a longitudinal seam in tubing, a welding transformer, current conducting contact members electrically connected to said welding transformer and adapted to contact with the surface of the tubing on opposite sides of the seam to be welded and to conduct impulsive welding current thereto, a magnetic core, an electric coil so constructed and arranged with respect to said core as to develop when energized a magnetic field of force in said magnetic core, said coil and said magnetic core being so constructed and arranged as to cause the magnetic lines of force of said magnetic field to extend in a substantially axial direction inside of said tubing and to extend in the same direction at any one instant from a point in advance of the contact areas of said contact members to a point behind said contact areas in the direction of tube travel, means for progressively moving said tubing in a direction parallel to the seam, and means for pressing the edges of the seam together.

21. In apparatus for the progressive, electric resistance welding of a longitudinal seam in tubing. a welding transformer, contact members for supplying alternating current from opposite terminals of said transformer by contact to opposite sides of the seam to be welded, and means for substantially limiting the flow of current around the back of the tubing comprising an electric coil adapted when energized to induce a circumferential electromotive force in the wall of said tubing throughout a zone extending longitudinally of the tubing in each direction from the region of contact of said contact members with said tubing, the direction of said electromotive force being, at each instant, the same along the entire extent of said zone, means for progressively moving the tubing in a direction parallel to the seam, and means for pressing the edges of the seam together.

22. The method of progressive electric resistance welding of a longitudinal seam in tubing which comprises applying to the opposite sides of the seam from an external source an electromotive force of sufficient magnitude to establish a zone of cross-seam current flow of appreciable longitudinal extent, maintaining a flash welding relation between the seam edges throughout a portion of the longitudinal extent of said zone of cross-seam current flow, inducing within the wall of the tube an electromotive force substantially circumferentially opposed to said applied electromotive force in the path around the back of the tube throughout the entire portion of the tube where said applied electromotive force is applied to the tube, causing progressive, relative traversing movement of said tube and said zone of cross-seam current flow in a direction parallel to the seam, and progressively pressing the seam edges together.

FRANK L. SESSIONS.